United States Patent
Ikejiri et al.

(10) Patent No.: US 12,246,276 B2
(45) Date of Patent: *Mar. 11, 2025

(54) SPUNBOND NON-WOVEN FABRIC, FILTER MATERIAL FOR PLEATED FILTER FOR DUST COLLECTOR, PLEATED FILTER FOR DUST COLLECTOR, AND LARGE AIR VOLUME PULSE-JET TYPE DUST COLLECTOR

(71) Applicant: Toray Industries, Inc., Tokyo (JP)

(72) Inventors: Yuki Ikejiri, Otsu (JP); Jun Yoshida, Otsu (JP); Koji Kitamura, Otsu (JP)

(73) Assignee: Toray Industries, Inc., Tokyo (JP)

(*) Notice: Subject to any disclaimer, the term of this patent is extended or adjusted under 35 U.S.C. 154(b) by 313 days.

This patent is subject to a terminal disclaimer.

(21) Appl. No.: 17/787,423

(22) PCT Filed: Dec. 23, 2020

(86) PCT No.: PCT/JP2020/048303
§ 371 (c)(1),
(2) Date: Jun. 20, 2022

(87) PCT Pub. No.: WO2021/132403
PCT Pub. Date: Jul. 1, 2021

(65) Prior Publication Data
US 2023/0046361 A1 Feb. 16, 2023

(30) Foreign Application Priority Data
Dec. 23, 2019 (JP) .................. 2019-232128

(51) Int. Cl.
*B01D 39/16* (2006.01)
*B01D 46/52* (2006.01)
(Continued)

(52) U.S. Cl.
CPC ....... *B01D 39/1623* (2013.01); *B01D 46/521* (2013.01); *D04H 3/011* (2013.01);
(Continued)

(58) Field of Classification Search
CPC .. B01D 39/1623; B01D 39/163; B01D 46/71; B01D 46/521; B01D 2239/1233;
(Continued)

(56) References Cited

U.S. PATENT DOCUMENTS 6,485,811 B1  11/2002  Horiguchi et al.
9,011,567 B2   4/2015  Sakamoto
(Continued)

FOREIGN PATENT DOCUMENTS

CA  3102518 A1  6/2019
CN  102211426 A  10/2011
(Continued)

OTHER PUBLICATIONS

Office Action (Notification to Grant Patent Right for Invention) issued Jan. 2, 2024, by the State Intellectual Property Office of People's Republic of China in corresponding Chinese Patent Application No. 202080088183.0 and an English translation of the Office Action. (6 pages).

(Continued)

*Primary Examiner* — Camie S Thompson
(74) *Attorney, Agent, or Firm* — Buchanan Ingersoll & Rooney PC

(57) ABSTRACT

A spunbond non-woven fabric includes a thermoplastic continuous filament. Bending resistance in a machine direction of the spunbond non-woven fabric is 40 mN or more and 80 mN or less, the spunbond non-woven fabric includes a nonbonded projected part and a bonded recessed part, and in a non-woven fabric cross-section, a thickness from one surface to another surface of the projected part is determined (Continued)

to be $t_A$, a thickness from one surface to another surface of the recessed part is determined to be $t_B$, and respective distances from one surface of the projected part to one surface of the recessed part are determined to be $t_C$ and $t_D$ ($t_C<t_D$), and the spunbond non-woven fabric has a relation represented by formulas (1) and (2) below:

$$0.5 \leq 1-t_B/t_A < 1.0 \qquad (1)$$

$$0.65 < t_C/t_D < 1.0 \qquad (2).$$

7 Claims, 3 Drawing Sheets

(51) Int. Cl.
  *D04H 3/011* (2012.01)
  *D04H 3/147* (2012.01)
(52) U.S. Cl.
  CPC ..... *D04H 3/147* (2013.01); *B01D 2239/0627* (2013.01); *D10B 2505/04* (2013.01)
(58) Field of Classification Search
  CPC ...... B01D 2239/0627; B01D 2239/421; B01D 2239/0407; D04H 3/147; D10B 2505/04
  See application file for complete search history.

(56) References Cited

U.S. PATENT DOCUMENTS

| | | | |
|---|---|---|---|
| 2012/0107567 A1 | 5/2012 | Terada et al. | |
| 2016/0367922 A1 | 12/2016 | Kamiyama | |
| 2020/0139282 A1* | 5/2020 | Mizogami | D04H 3/011 |
| 2022/0410046 A1* | 12/2022 | Mizogami | B01D 46/71 |

FOREIGN PATENT DOCUMENTS

| | | | |
|---|---|---|---|
| CN | 102459736 | A | 5/2012 |
| CN | 102985608 | A | 3/2013 |
| CN | 105934266 | A | 9/2016 |
| CN | 107614772 | A | 1/2018 |
| CN | 110494201 | A | 11/2019 |
| JP | 09192426 | A | 7/1997 |
| JP | 11253718 | A | 9/1999 |
| JP | 2001054709 | A | 2/2001 |
| JP | 2003275519 | A | 9/2003 |
| JP | 2007098259 | A | 4/2007 |
| JP | 2007231500 | A | 9/2007 |
| JP | 4522671 | B2 | 8/2010 |
| JP | 5298803 | B2 | 9/2013 |
| JP | 5422874 | B2 | 2/2014 |
| JP | 2017127832 | A | 7/2017 |
| JP | 2021098196 | A | 7/2021 |
| WO | 9737071 | A1 | 10/1997 |

OTHER PUBLICATIONS

Extended European Search Report for European Application No. 20905204.2, dated May 11, 2023, 7 pages.
Chinese Office Action for Chinese Application No. 2020800881830, dated Feb. 28, 2023 with translation, 17 pages.
Chinese Office Action for Chinese Application No. 202080088183.0, dated Jun. 27, 2023 with translation, 16 pages.
Decision to Grant a Patent for Japanese Application No. 2021-502640, dated Sep. 7, 2021, 4 pages.
International Search Report and Written Opinion for International Application No. PCT/JP2020/048303, dated Mar. 16, 2021, 5 pages.

* cited by examiner

SPUNBOND NON-WOVEN FABRIC, FILTER MATERIAL FOR PLEATED FILTER FOR DUST COLLECTOR, PLEATED FILTER FOR DUST COLLECTOR, AND LARGE AIR VOLUME PULSE-JET TYPE DUST COLLECTOR

CROSS REFERENCE TO RELATED APPLICATIONS

This application is the U.S. National Phase application of PCT/JP2020/048303, filed Dec. 23, 2020, which claims priority to Japanese Patent Application No. 2019-232128, filed Dec. 23, 2019, the disclosures of these applications being incorporated herein by reference in their entireties for all purposes.

FIELD OF THE INVENTION

The present invention relates to a spunbond non-woven fabric, a filter material for a pleated filter for a dust collector, a pleated filter for a dust collector, and a large air volume pulse-jet type dust collector having excellent rigidity and air permeability.

BACKGROUND OF THE INVENTION

Dust collectors are conventionally used in order to remove and collect dust in work environments where dust is generated, and, among the dust collectors, a pulse-jet type dust collector that can reduce the frequency of filter replacement has been known. In this pulse-jet type dust collector, the outside of the filter is the filtration surface, and the dust collector is operated with the filter attached to a filter gauge. The pulse-jet type dust collector has a mechanism that enables backwashing, in which compressed air is sent inside the filter when the pressure of the filter reaches a certain pressure. The backwashing allows dust accumulated on the outer surface of the filter to be brushed off and the filter to be repeatedly used. The filter for this dust collector has been known to be used in a pleated folded shape, which allows a filtration area to be significantly increased, pressure drop to be reduced, and collection efficiency to be enhanced by forming the pleated shape.

Of the non-woven fabrics used as materials for the filters for such dust collectors, spunbond non-woven fabrics in particular are used as filters for home and office air conditioners and industrial dust collectors because the filters have excellent lint-free properties and are easy to obtain excellent strength performance compared to staple fiber non-woven fabrics.

The spunbond non-woven fabric used for a filter for a dust collector is required to satisfy both dust collection performance and air permeability and various non-woven fabrics have been developed until now. For example, Patent Literature 1 and Patent Literature 2 have disclosed non-woven fabrics made by previously heating and bonding a thermoplastic continuous filament with a pair of flat rolls and thereafter partially bonding the resultant product with a pair of engraved embossing rolls. In addition, Patent Literature 3 has disclosed non-woven fabrics made by forming a mixed fiber made of a thermoplastic continuous filament of a high melting point component and a thermoplastic continuous filament of a low melting point component and non-woven fabrics made of a composite fiber having a multilobed shape composed of a high melting point component and a low melting point component.

PATENT LITERATURE

Patent Literature 1: Japanese Patent No. 5422874
Patent Literature 2: Japanese Patent No. 5298803
Patent Literature 3: Japanese Patent No. 4522671

SUMMARY OF THE INVENTION

As the above pulse-jet type dust collector, a large air volume pulse-jet type dust collector is used in places where a large volume of air including fine powder dust particles is required to be processed at 300 to 1,500 L per minute such as chemical plants. The filter used in such a large air volume pulse-jet type dust collector is repeatedly subject to passage of a large volume of air (gas) and backwashing and thus the spunbond non-woven fabric alone is used as the spunbond non-woven fabric for filters without laminating a substrate such as a PTFE film, which may cause delamination and other problems. In addition, the spunbond non-woven fabric for filters to be used is required to have rigidity satisfying pleated shape retention in order to withstand dust collection under a large air volume and repeatedly performed backwashing. With respect to the conventional spunbond non-woven fabric for filters used for dust removal, however, a non-woven fabric having rigidity sufficient for pleated shape retention under a large air volume and pleated workability while a balance between dust collection performance and air permeability is being satisfied has not been obtained. Namely, there has been a problem in that when the bonding between fibers is made stronger in order to improve the collection performance, the opening becomes smaller and thus air permeability is lowered, whereas when the bonding between the fibers is made loose in order to improve the air permeability, the opening becomes larger and thus not only is the dust collection performance reduced, but also the pleated shape cannot be retained under a large air volume due to reduction in the rigidity and fluffiness occurred, which is problematic from the viewpoint of appearance.

For example, in technologies disclosed in Patent Literatures 1 and 2, it is difficult to satisfy both sufficient air permeability and rigidity at the same time.

On the other hand, in Patent Literature 3, there has been a problem in that the bonding between fibers is weak and the rigidity of the non-woven fabric decreases due to breakage of the bonded part during pleat formation. Consequently, the pleated shape cannot be retained under a large air volume when the non-woven fabric is used as a filter, resulting in a decrease in air permeability.

In view of the above problems, an object of the present invention is to provide a spunbond non-woven fabric, a filter material for a pleated filter for a dust collector, a pleated filter for a dust collector, and a large air volume pulse-jet type dust collector having high rigidity that is excellent in pleated shape retention under a large air volume and pleated workability while a balance between the dust collection performance and air permeability is satisfied.

As a result of intensive study for achieving the above object, the inventors of the present invention have found that a spunbond non-woven fabric having rigidity sufficient for pleat formation while the balance between dust collection performance and air permeability is satisfied is obtained from a non-woven fabric in which the ratio of the thickness of a projected part to the thickness of a recessed part and the ratio of the distance from the surface of the projected part to the surface of the recessed part obtained from the cross-section of the non-woven fabric made of a partially bonded thermoplastic continuous filament are within the ranges of specific values.

The present invention has been attained based on these findings and, according to the present invention, the following inventions are provided.

That is, a spunbond non-woven fabric according to the present invention includes a thermoplastic continuous filament including a high melting point component and a low melting point component, the spunbond non-woven fabric being made by partially being bonded. Bending resistance in a machine direction of the spunbond non-woven fabric is 40 mN or more and 80 mN or less, the spunbond non-woven fabric includes a non-bonded projected part and a bonded recessed part, and in a non-woven fabric cross-section, a thickness from one surface to another surface of the projected part is determined to be $t_A$, a thickness from one surface to another surface of the recessed part is determined to be $t_B$, and respective distances from one surface of the projected part to one surface of the recessed part are determined to be $t_C$ and $t_D$ ($t_C < t_D$), and the spunbond non-woven fabric has a relation represented by formulas (1) and (2) below:

$$0.5 \leq 1 - t_B/t_A < 1.0 \quad (1)$$

$$0.65 < t_C/t_D < 1.0 \quad (2).$$

According to a preferable aspect of the spunbond non-woven fabric of the present invention, a CV value of a basis weight is 5% or less.

According to a preferable aspect of the spunbond non-woven fabric of the present invention, a ratio of a bonding area of the recessed part is 5% or more and 20% or less.

According to a preferable aspect of the spunbond non-woven fabric of the present invention, an average single fiber diameter of the thermoplastic continuous filament in the spunbond non-woven fabric is 12 μm or more and 26 μm or less.

The spunbond non-woven fabric of the present invention is used as a filter material for a pleated filter for a dust collector.

The filter material for a pleated filter for a dust collector of the present invention is used as a pleated filter for a dust collector.

The pleated filter for a dust collector of the present invention is used as a large air volume pulse-jet type dust collector.

According to the present invention, a spunbond non-woven fabric having an excellent balance between the dust collection performance and air permeability, and having high rigidity that is excellent in pleated shape retention under a large air volume and pleated workability can be obtained.

DETAILED DESCRIPTION OF EMBODIMENTS OF THE INVENTION

Hereinafter, embodiments for implementing the present invention will be described in detail. The present invention, however, is not limited by the following embodiments.

Figure 1:
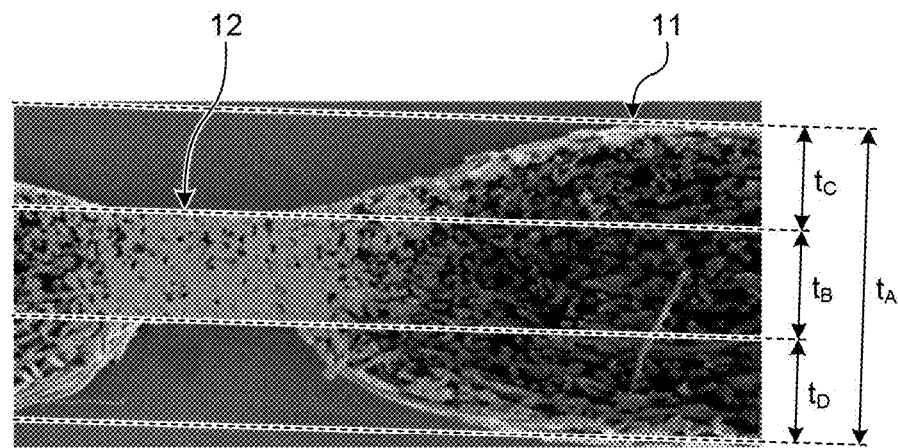
FIG. 1 is a cross-sectional photograph of a spunbond non-woven fabric according to one embodiment of the present invention.

The spunbond non-woven fabric according to the present invention is a non-woven fabric made of a thermoplastic continuous filament. The thermoplastic continuous filament is composed of a high melting point component and a low melting point component. FIG. 1 is a cross-sectional photograph of the spunbond non-woven fabric according to one embodiment of the present invention. The spunbond non-woven fabric illustrated in FIG. 1 allows air to pass from the upper side to the lower side at the time of use. The spunbond non-woven fabric is partially bonded and the bending resistance of the above non-woven fabric in a machine direction (MD) is 40 mN or more and 80 mN or less. The spunbond non-woven fabric has a non-bonded projected part 11 (non-bonded part) and a bonded recessed part 12 (bonded part) and is a spunbond non-woven fabric having a relation represented by the following formula, where the thickness from one surface of the projected part to the other surface, the thickness from one surface of the recessed part to the other surface, and the distances from one surface of the projected part to one surface of the recessed part are determined to be ($t_A$), ($t_B$), ($t_C$), and ($t_S$), respectively ($t_C < t_D$).

$$0.5 \leq 1 - t_B/t_A < 1.0 \quad (1)$$

$$0.65 < t_C/t_D < 1.00 \quad (2)$$

In the present invention, the machine direction refers to a sheet transport direction during the production of the spunbond non-woven fabric, that is, a winding direction with respect to a non-woven fabric roll and the transverse direction (TD) described below refers to a direction that perpendicularly intersects with the sheet transport direction, that is, the winding direction with respect to the non-woven fabric roll. In the case where the spunbond non-woven fabric is not in a rolled state, for example, in the case where the spunbond non-woven fabric is cut, the machine direction and the transverse direction are determined by the following procedures.

(a) One direction is arbitrarily determined in the face of the spunbond non-woven fabric and a test specimen having a length of 38.1 mm and a width of 25.4 mm is collected along this direction.

(b) In the same manner, test specimens having a length of 38.1 mm and a width of 25.4 mm in the directions rotated at 30 degrees, 60 degrees, and 90 degrees from the direction in which the test specimen is collected are collected.

(c) The bending resistance of each of the test specimens in each direction is measured in accordance with the method for measuring the bending resistance of spunbond non-woven fabrics described below.

(d) The direction indicating the highest value obtained by the measurement is determined to be the machine direction of the spunbond non-woven fabric and the direction perpendicular to the machine direction is determined to be the transverse direction.

Figure 2:
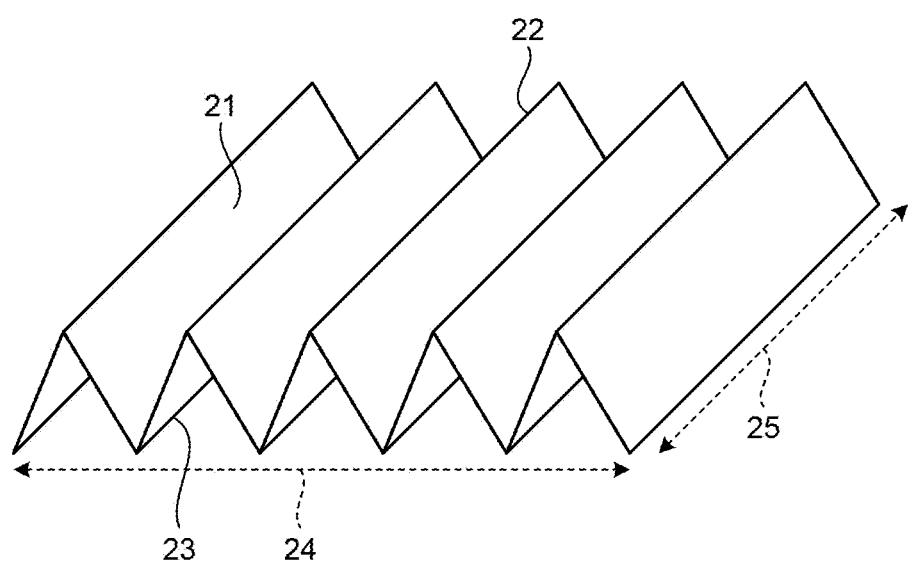
FIG. 2 is a schematic perspective view of one example of a filter material for a pleated filter for a dust collector according to the present invention.

The spunbond non-woven fabric according to the present invention is also used for a filter, for example, a filter material for a pleated filter for a duct collector. FIG. 2 is a schematic perspective view of one example of a filter material for a pleated filter for a dust collector.

A filter material 21 for a pleated filter for a dust collector illustrated in FIG. 2 has a mountain section 22 and a valley section 23 formed by folding over the spunbond non-woven fabric. When the machine direction and the transverse direction are determined from the filter material for a pleated filter for a dust collector and the like, in the case of a filter material 21 for a pleated filter for a dust collector as illustrated in FIG. 2, the direction parallel to the ridge of the mountain section 22 (dashed arrow 25) is determined to be the transverse direction and the direction perpendicular to the transverse direction (dashed arrow 24) is determined to be the machine direction.

(Thermoplastic Continuous Filament)

As a thermoplastic resin serving as a raw material for the thermoplastic continuous filament that constitutes the spunbond non-woven fabric according to the present invention, polyester is particularly preferably used. Polyester is a macromolecular polymer composed of an acid component and an alcohol component as monomers. As the acid component, for example, aromatic carboxylic acids such as phthalic acid (ortho form), isophthalic acid, and terephthalic acid, aliphatic dicarboxylic acids such as adipic acid and sebacic acid, and alicyclic dicarboxylic acids such as cyclohexane carboxylic acid may be used. As the alcohol component, for example, ethylene glycol, diethylene glycol, and polyethylene glycol may be used.

Examples of the polyester include polyethylene terephthalate (PET), polybutylene terephthalate (PBT), polytrimethylene terephthalate (PTT), polyethylene naphthalate, polylactic acid, and polybutylene succinate. As the polyester used as the high melting point polymer described below, PET, which has a high melting point, excellent heat resistance, and high rigidity, is most preferably used.

Additives such as nucleating agents, matting agents, pigments, antifungal agents, antimicrobial agents, flame retardants, metal oxides, aliphatic bisamides and/or aliphatic monoamides, and hydrophilic agents may be added to these polyester raw materials to the extent that the effects of the present invention are not impaired. Of these additives, the metal oxides such as titanium dioxide have effects of improving spinnability by reducing surface friction of the fiber and preventing bonding of fibers to each other, and improving the bonding properties of the non-woven fabric by increasing thermal conductivity during bonding molding of the non-woven fabric using hot rolls. The aliphatic bisamides such as ethylene bis-stearamide and/or alkyl-substituted aliphatic monoamides also have effects of enhancing the mold release properties between the hot rolls and the non-woven fabric web and improving transportability.

Subsequently, the thermoplastic continuous filament that constitutes the spunbond non-woven fabric according to the present invention is composed of a high melting point component and a low melting point component. The thermoplastic continuous filament is preferably an aspect of a composite filament formed by arranging a polyester-based low melting point polymer serving as the low melting point component having a melting point 10° C. or more and 140° C. or less lower than the melting point of the polyester-based high melting point polymer around the polyester-based high melting point polymer serving as the high melting point component. By performing the above treatment, the composite polyester fiber (filament) constituting the spunbond non-woven fabric is strongly bonded to each other when the spunbond non-woven fabric is formed by bonding and used, and thus the spunbond non-woven fabric has excellent mechanical strength and can sufficiently withstand dust processing under large air volumes.

In the present invention, the melting point of thermoplastic resin is measured using a differential scanning calorimeter (for example, "DSC-2", manufactured by Perkin Elmer Japan Co., Ltd.) under conditions of a temperature increase rate of 20° C./min and a measurement temperature range of 30° C. to 300° C. and a temperature providing an extremum in the obtained melting endothermic curve is determined to be the melting point of the thermoplastic resin. With respect to a resin that does not indicate an extremum in the melting endothermic curve in the differential scanning calorimeter, a temperature at which the resin melts under microscopic observation during heating on a hot plate is determined to be the melting point.

In the case where the thermoplastic resin is the polyester, examples of the combination of the polyester-based high melting point polymer and the polyester-based low melting point polymer (hereinafter may be described in the order of the polyester-based high melting point polymer/polyester-based low melting point polymer) may include PET/PBT, PET/PTT, PET/polylactic acid, and PET/copolymer PET. Of these combinations, the combination of PET/copolymer PET is preferably used because of excellent spinnability. As a copolymer component of the copolymer PET, isophthalic acid-copolymer PET is preferably used because of excellent spinnability in particular.

With respect to the composite form of the composite filament, for example, a concentric core-sheath type form, an eccentric core-sheath type form, and a sea-island type form may be exemplified. Of these shapes, the concentric core-sheath type composite filament is preferable because this filament can be uniformly and strongly bonded to each other. Furthermore, examples of the cross-sectional shape of the composite filament include a circular cross-section, a flat cross-section, a polygonal cross-section, a multilobed cross-section, and a hollow cross-section. Of these filaments, as a preferable aspect, the filament having the circular cross-sectional shape as the cross-sectional shape of the filament is used.

As the form of the above composite filament, for example, a method for forming the mixed fiber from the fiber made of the polyester-based high melting point polymer and the fiber made of the polyester-based low melting point polymer may be exemplified. In the case of the method for forming the mixed fiber, however, uniform bonding is difficult. For example, bonding is weak in a region where the fiber made of the polyester-based high melting point polymer is densely gathered and thus the mechanical strength and the rigidity are inferior, resulting in an unsuitable composite filament for the spunbond non-woven fabric. On the other hand, a method for imparting a low melting point polymer to the fiber made of the polyester-based high melting point polymer by dipping or spraying is exemplified. However, both methods have difficulty to uniformly impart the low melting point polymer onto the surface layer and in the thickness direction. Consequently, the composite filament has inferior mechanical strength and rigidity, and thus is not preferable for the spunbond non-woven fabric.

The melting point of the polyester-based low melting point polymer in the present invention is preferably 10° C. or more and 140° C. or less lower than the melting point of the polyester-based high melting point polymer. Setting the melting point to 10° C. or more, preferably 20° C. or more, and more preferably 30° C. or more lower allows moderate bonding properties to be obtained in the spunbond nonwoven fabric. On the other hand, setting the melting point of the polyester-based low melting point polymer to 140° C. or less, preferably 120° C. or less, and more preferably 100° C. or less lower than the melting point of the polyester-based high melting point polymer allows deterioration in the heat resistance of the spunbond non-woven fabric to be reduced.

The melting point of the polyester-based high melting point polymer is preferably in the range of 200° C. or more and 320° C. or less. Setting the melting point of polyester-based high melting point polymer to preferably 200° C. or more, more preferably 210° C. or more, and further preferably 220° C. or more allows a filter having excellent heat resistance to be obtained. On the other hand, setting the melting point of polyester-based high melting point polymer to preferably 320° C. or less, more preferably 300° C. or less, and further preferably 280° C. or less allows the consumption of large amounts of thermal energy in order to melt the material during non-woven fabric production and decrease in productivity to be reduced.

The melting point of the polyester-based low melting point polymer is preferably in the range of 160° C. or more and 250° C. or less. Setting the melting point of the polyester-based low melting point polymer to preferably 160° C. or more, more preferably 170° C. or more, and further preferably 180° C. or more allows excellent shape retention to be provided even after passing through a step in which heat is applied during pleated filter production such as heat setting during pleat formation. On the other hand, setting the melting point of the polyester-based low melting point polymer to preferably 250° C. or less and more preferably 240° C. or less allows a filter having excellent bonding properties during non-woven fabric production and excellent mechanical strength to be obtained.

The aspect of the content ratio of the polyester-based high melting point polymer to the polyester-based low melting point polymer is preferably in the range of 90:10 to 60:40, and more preferably in the range of 85:15 to 70:30 in a mass ratio. Setting the content of the polyester-based high melting point polymer to 60% by mass or more and 90% by mass or less allows the rigidity and heat resistance of the spunbond non-woven fabric to be excellent. On the other hand, setting the content of the low melting point polyester to 10% by mass or more and 40% by mass or less allows the composite polyester fiber (filament) that constitutes the spunbond non-woven fabric to be strongly bonded to each other when the spunbond non-woven fabric is formed by bonding and used, resulting in excellent mechanical strength and sufficient resistance to dust collection under large air volume.

Examples of the composite form of the composite polyester fiber include a concentric core-sheath type form, an eccentric core-sheath type form, and a sea-island type form. Of these forms, the concentric core-sheath type form is preferable with regard to the composite form because the filament can be uniformly and strongly bonded to each other. Furthermore, examples of the cross-sectional shape of the filament (single fiber) include shapes of a circular cross-section, a flat cross-section, a polygonal cross-section, a multilobed cross-section, and a hollow cross-section. Of these cross-sectional shapes, the circular cross-sectional shape of the filament (single fiber) is a preferable aspect.

The average single fiber diameter of the thermoplastic continuous filament constituting the spunbond non-woven fabric according to the present invention is preferably in the range of 12 µm or more and 26 µm or less. Setting the average single fiber diameter of the thermoplastic continuous filament to 12 µm or more, preferably 13 µm or more, and more preferably 14 µm or more allows the air permeability of the spunbond non-woven fabric to be improved and pressure drop to be reduced. This setting also allows the number of thread breakages when the thermoplastic continuous filament is formed to be decreased and stability during production to be improved. On the other hand, setting the average single fiber diameter of thermoplastic continuous filament to 26 µm or less, preferably 25 µm or less, and more preferably 24 µm or less allows the uniformity of the spunbond non-woven fabric to be improved to form a dense non-woven fabric surface, resulting in improving collection performance, for example, in which dust can be easily filtrated at the surface layer.

In the present invention, as the average single fiber diameter (µm) of spunbond non-woven fabric, the value obtained by the following method is determined to be employed.
  (i) Ten small samples are randomly collected from the spunbond non-woven fabric.
  (ii) Photographs in which the thickness of the fibers can be measured in the range of 500 to 2,000 times at the surface of each of the collected small samples are taken using a scanning electron microscope or other means.
  (iii) Ten fibers from each of the samples, that is, 100 fibers in total are arbitrarily selected and the thicknesses of the selected fibers are measured. The fibers are assumed to have a circular cross section and the thickness is determined to be the single fiber diameter.
  (iv) A value is calculated by rounding off the arithmetic mean value of those values to the first decimal place and this value is determined to be the average single fiber diameter.

(Method of Producing Spunbond Non-Woven Fabric)

Subsequently, the method for producing the spunbond non-woven fabric according to the present invention will be described. The spunbond non-woven fabric according to the present invention is produced by sequentially performing steps (a) to (c) described below.
  (a) A step of melt-extruding the thermoplastic polymer from a spinning spinnerret, and thereafter pulling and stretching the extruded products by an air-sucker to obtain the thermoplastic continuous filament.
  (b) A step of opening the obtained filament and depositing the filament on a moving net conveyor by regulating the fiber arrangement with an opening plate to form a fiber web.
  (c) A step of partially bonding the obtained fiber web.

Each of the steps will be described in more detail below.

(a) Thermoplastic Continuous Filament Formation Step

First, the thermoplastic polymer is melt-extruded from the spinning spinneret. In particular, in the case where the composite filament in which the polyester-based low melting point polymer having a lower melting point than the melting point of the polyester-based high melting point polymer is arranged around the polyester-based high melting point polymer is used as the thermoplastic continuous filament, as the composite filament in which each of the polyester-based high melting point polymer and the polyester-based low melting point polymer is melted at the respective melting points or more and (melting point+70° C.) or less and a polyester-based low melting point polymer having a melting point of 10° C. or more and 140° C. or less lower than the melting point of the polyester-based high melting point polymer is arranged around the polyester-based high melting point polymer, a filament having a circular cross-sectional shape is spun by spinning the melted polymers from fine holes of a spinning spinneret having a spinneret temperature of the melting point or more and (melting point+70° C.) or less and thereafter pulling and stretching the spun material by an air-sucker at a spinning speed of 4,000 m/minute or more and 6,000 m/minute or less.

(b) Fiber Web Forming Step

The non-woven fabric according to the present invention is what is called a spunbond non-woven fabric and the method for producing the same includes a step of sucking the spun thermoplastic continuous filament with an ejector and depositing the filament on the moving net conveyer by jetting from the opening plate having a slit-like part at the lower part of the ejector to obtain the fiber web.

Even in the case where the composite polyester fiber is used, it is important that the spunbond non-woven fabric is made of the above filament (long fiber). By performing the above treatment, the rigidity and mechanical strength can be improved compared to the case of a staple fiber non-woven fabric composed of a non-continuous fiber and thus the spunbond non-woven fabric can be preferable as the spunbond non-woven fabric.

In the method of producing the spunbond non-woven fabric according to the present invention, temporarily bonding the fiber web collected on the net conveyer is also a preferable aspect. As the temporary bonding, a method of bonding the collected fiber web by a pair of flat rolls or a method of installing a flat roll on the net conveyer and bonding the fiber web between the net conveyer and the flat roll is preferably used.

The temperature for the temporary bonding is preferably a temperature of 70° C. or more and 120° C. or less lower than the melting point of the polyester-based low melting point polymer. Setting the temperature as described above allows conveying properties to be improved without excessive bonding between fibers.

The linear pressure for temporary bonding is preferably 30 kg/cm or more and 70 kg/cm or less. Setting the linear pressure for temporary bonding to 30 kg/cm or more and more preferably 40 kg/cm or more allows mechanical strength required for conveying the fiber web to the next step to be provided. Setting the linear pressure for temporary bonding to 70 kg/cm or less and more preferably 60 kg/cm or less allows excessive bonding between fibers to be prevented.

(c) Partial Bonding Step

The spunbond non-woven fabric according to the present invention is partially bonded. A method of partially bonding, however, is not particularly limited. Here, a part where the spunbond non-woven fabric is bonded is referred to as a bonded part and a part where the spunbond non-woven fabric is not bonded other than the bonded part is referred to as a non-bonded part. Bonding by hot embossing rolls or by a combination of ultrasonic oscillator and embossing rolls is preferable. In particular, bonding by hot embossing rolls is most preferable from the viewpoint of improving the strength of the non-woven fabric. The partial bonding step is preferably continuously processed from the above web forming step. Continuous processing from the above web forming step allows the density of the bonded part to be increased and thus a non-woven fabric having stiffness strength, which provides excellent pleated formability, to be obtained as the spunbond non-woven fabric. The temperature of the bonding by the hot embossing rolls is preferably a temperature of 5° C. or more and 60° C. or less lower and more preferably 10° C. or more and 50° C. or less lower than the melting point of the polymer having the lowest melting point existing on the fiber surface of the non-woven fabric.

Setting the temperature difference between the melting point of the polymer having the lowest melting point on the fiber surface of the non-woven fabric and the temperature of the bonding by the hot embossing rolls to 5° C. or more and more preferably 10° C. or more allows excessive bonding to be prevented. On the other hand, setting the temperature difference between the melting point and the temperature of the bonding to 60° C. or less and more preferably 50° C. or less allows uniform bonding to be achieved in the non-woven fabric.

The linear pressure for bonding is preferably 30 kg/cm or more and 90 kg/cm or less. Setting the linear pressure for bonding to 30 kg/cm or more and more preferably 40 kg/cm or more allows the strength necessary for pleated workability to be provided to the non-woven fabric when the product is used as the spunbond non-woven fabric. Setting the linear pressure for bonding to 90 kg/cm or less and more preferably 80 kg/cm or less allows excessive bonding to be prevented.

The ratio of an area of the bonded part of the spunbond non-woven fabric according to the present invention (hereinafter simply described as a bonding area ratio) is the ratio of the bonded part (recessed part) to the total area of the non-woven fabric and a preferable range is 5% or more and 20% or less relative to the total area of the non-woven fabric. A bonding area ratio of 5% or more, more preferably 6% or more, and further preferably 8% or more allows the mechanical strength of the non-woven fabric to be sufficiently obtained and, in addition, the surface to be less likely to fluff. On the other hand, a bonding area ratio of 20% or less, more preferably 18% or less, and further preferably 16% or less allows collection performance not to be deteriorated because the inter-fiber voids are not reduced and thus the pressure drop is not increased.

For measuring the bonding area ratio of the spunbond non-woven fabric, a digital microscope (for example, "VHX-5000", manufactured by Keyence Corporation) is used. The bonding area ratio (%) is determined by collecting 100 rectangular frames having a size of 1.0 cm×1.0 cm in parallel with the machine direction and the transverse direction from arbitrarily parts of the spunbond non-woven fabric under a magnification of the microscope of 20 times, with respect to each of the 100 rectangular frames, determining an average value by measuring the areas of the bonded part in the rectangular frame relative to the areas of the rectangular frame, and rounding the average value to an integer in percentage. In the case where the bonding area ratio is not represented as a percentage, the bonding area ratio can be calculated by dividing the area of the bonded part (cm$^2$) within the above rectangular frame by 1.0 cm$^2$, which is the area of the rectangular frame, and thereafter rounding off the obtained value to the second decimal place.

The bonded part forms a dent, which is formed by bonding the thermoplastic continuous filament that constitutes the non-woven fabric to each other by heat and pressure. In other words, the part where the thermoplastic continuous filament is bonded and agglomerated compared to other parts is the bonded part. In the case where bonding by hot embossing rolls is employed as the method of bonding, a part where the thermoplastic continuous filament is bonded and agglomerated by the projected part in the embossing rolls is the bonded part. For example, in the case where a roll having a predetermined pattern of unevenness is used only on the upper side or the lower side and a flat roll having no unevenness is used for another roll, the bonded part refers to a part where the thermoplastic continuous filament of the non-woven fabric is bonded to each other by the projected part of the roll having the unevenness and the flat roll. For example, in the case where embossing rolls made of a pair of an upper roll and a lower roll having a plurality of parallelly arranged linear grooves on the surface of the roll and providing the grooves so that the grooves of the upper roll and the grooves of the lower roll intersect at a certain angle are used, the bonded part refers to a part where the thermoplastic continuous filament of the non-woven fabric is agglomerated by bonding the thermoplastic continuous filament between the projected part of the upper roll and the projected part of the lower roll. In this case, a part bonded between the upper projected part and the lower recessed part or the upper recessed part and the lower projected part is not included in the bonded part described here.

As the area per bonded part, an area of 0.3 mm² or more and 5.0 mm² or less is preferable. Setting the area to 0.3 mm² or more allows sufficient mechanical strength to be obtained as the spunbond non-woven fabric and fluffiness on the surface of the non-woven fabric to be reduced. Setting the area to 5.0 mm² or less allows the air permeability to be retained in addition to the mechanical strength as the spunbond non-woven fabric and thus sufficient collection performance to be obtained.

The shape of the bonded part of the spunbond non-woven fabric according to the present invention is not particularly specified. In the case where the roll having unevenness of the predetermined pattern is used in the upper side or the lower side alone and a flat roll having no unevenness is used as another roll, or the bonding is performed between the projected part of the upper roll and the projected part of the lower roll in embossing rolls made of a pair of the upper roll and the lower roll having a plurality of parallelly arranged linear grooves on the surfaces of the rolls and providing the grooves so that the grooves of the upper roll and the grooves of the lower roll intersect at a certain angle, the shape of the bonded part may be circular, triangular, rectangular, parallelogram, oval, and rhombic. The arrangement of these bonded parts is not particularly specified and the bonded parts may be regularly arranged at equal intervals, randomly arranged, or arranged in a mixed manner of different shapes. Of these arrangements, arrangement in which the bonded parts are arranged at equal intervals is preferable from the viewpoint of uniformity of the non-woven fabric. Furthermore, from the viewpoint of partial bonding without peeling off the non-woven fabric, a parallelogram-shaped bonded part formed by using the embossing rolls made of a pair of the upper roll and the lower roll having a plurality of parallelly arranged linear grooves on the surfaces of the rolls and providing grooves so that the grooves of the upper roll and the grooves of the lower roll intersect at a certain angle and bonding between the projected part of the upper roll and the projected of the lower roll is preferable.

(Spunbond Non-Woven Fabric)

The spunbond non-woven fabric according to the present invention has a bending resistance of 40 mN or more and 80 mN or less in the machine direction of the non-woven fabric. A bending resistance of 40 mN or more, more preferably 45 mN or more, and further preferably 50 mN or more allows pleat to be formed while the strength and morphological retention of the non-woven fabric are being maintained. On the other hand, a bending resistance of 80 mN or less, preferably 75 mN or less, and further preferably 70 mN or less allows the folding resistance during pleat forming to be relaxed and the mountain-valley shape of the pleat to be sharply finished.

The bending resistance in the present invention is determined to be a value obtained by the following procedures in accordance with JIS L1913: 2010 "Test methods for nonwovens", 6.7 "Bending resistance (JIS method and ISO method)" 6.7.4 "Gurley Method (JIS method)".

(i) Test specimens having a length of 38.1 mm (effective specimen length L of 25.4 mm) and a width d of 25.4 mm are collected from any five positions in a sample. In the present invention, the longitudinal direction of the non-woven fabric is determined to be the longitudinal direction of the sample.

(ii) Each of the collected test specimens is attached to a chuck and the chuck is fixed in alignment with the scale 1½" (1.5 inches=38.1 mm) on a movable arm A. In this case, ½" (0.5 inch=12.7 mm) of the sample length is overlapped with the chuck by ¼" (0.25 inch=6.35 mm) and with the tip of the pendulum by ¼" (0.25 inch=6.35 mm) at the free end of the sample. Therefore, the effective test specimen length L for the measurement is a length in which ½" (0.5 inch=12.7 mm) is subtracted from the test specimen length.

(iii) Subsequently, appropriate weights $W_a$, $W_b$, and $W_c$ (g) are attached to the weight attachment holes a, b, and c (mm) at the lower parts from the fulcrum of pendulum B, the movable arm A is rotated at a constant speed, and the scale RG (mgf) is read when the test specimen is detached from the pendulum B. The scale is read at the first decimal place. The weight to be attached in the weight attachment hole can be appropriately selected. The weight is preferably set so that the scale RG indicates 4 to 6.

(iv) Measurements are performed 5 times for each front side and back side of each of the five test specimens, that is, 50 times in total.

(v) The values of the bending resistance are determined from the obtained respective scale RG values in accordance with the following formula (3) by rounding off the calculated values of the bending resistance to the first decimal place. The average value of 50 measurements is rounded off to the first decimal place and the calculated value is determined to be the bending resistance in the machine direction.

$$Br = RG \times (aW_a + bW_b + cW_c) \times \frac{(L - 12.7)^2}{d} \times 3.375 \times 10^{-5} \quad (3)$$

The spunbond non-woven fabric in the present invention is a spunbond non-woven fabric in which the thickness from one surface to the other surface of the projected part ($t_A$) and the thickness from one surface to the other surface of the recesses part ($t_B$) in the non-woven fabric cross-section have a relation represented by the above formula (1). The spunbond non-woven fabric having the value of the above formula (1) of 0.50 or more, more preferably 0.53 or more, and further preferably 0.55 or more allows the bonding between fibers to be stronger and thus excellent pleated shape retention to be obtained even under large air volume when the spunbond non-woven fabric is used as a pleated filter for a dust collector. On the other hand, the spunbond non-woven fabric having the value of the above formula (1) of 1.00 or less, more preferably 0.90 or less, and further preferably 0.80 or less allows the bonding between fibers to be loose and thus excellent air permeability to be obtained.

The spunbond non-woven fabric in the present invention is a spunbond non-woven fabric having a relation represented by the above formula (2) where the respective distances from one surface of the projected part to one surface of the recessed part are determined to be ($t_C$) and ($t_D$) ($t_C<t_D$). The spunbond non-woven fabric having the value of the above formula (2) of 0.65 or more, more preferably 0.66 or more, and even more preferably 0.67 or more allows the unevenness of the non-woven fabric to be smaller and the mountain-valley shape of the pleat to be sharply finished during pleat formation. On the other hand, the spunbond non-woven fabric having the value of the above formula (2) of 1.00 or less, more preferably 0.90 or less, and further preferably 0.80 or less allows the bonded part and the non-bonded part to coexist in the non-woven fabric and the non-woven fabric having well-balanced air permeability and rigidity to be obtained.

In the present invention, as the thickness from one surface to the other surface of the projected part ($t_A$), the thickness from one surface to the other surface of the recessed part ($t_B$), the value of the above formula (1), and the respective distances from one surface of the projected part to one surface of the recessed part ($t_C$) and ($t_D$) ($t_C<t_D$) and the value of the above formula (2) in the present invention, values determined in accordance with the following procedures are determined to be employed.
  (i) At any bonded part (recessed part), the intersection of the center line in the machine direction and the center line in the transverse direction is determined to be the center point of the bonded part (recessed part).
  (ii) A straight line parallel to the transverse direction passing through the center point of the above bonded part (recessed part) is drawn.
  (iii) Straight lines of 1.0 cm are drawn along the machine direction using two points on the straight lines 0.5 cm away from the center point of the above bonded part (recessed part) as the starting points and a straight line connecting the end points of the straight lines is drawn.
  (iv) The area surrounded by a 1.0 cm×1.0 cm square formed in (i) to (iii) is cut away with a razor blade.
  (v) In the same manner, 100 pieces in total of the measurement samples of 1.0 cm×1.0 cm are collected from any location in the spunbond non-woven fabric.
  (vi) Using a scanning electron microscope (SEM) (for example, "VHX-D500", manufactured by Keyence Corporation), the cross section is observed and photographed by adjusting a magnification to 100 times using the bonded part in the measurement sample as the center.
  (vii) Tangent lines are drawn from the two highest parts of adjacent non-bonded parts (projected parts) and the lengths of the following cross-sectional thicknesses $t_A$ to $t_D$ of the spunbond non-woven fabric ($t_C<t_D$) are measured by a distance between lines parallel to these tangent lines.
  $t_A$: Distance between the highest parts of the non-bonded parts (projected parts) from one surface to the other surface
  $t_B$: Distance between the highest parts of the bonded parts (recessed part) from one surface to the other surface
  $t_C$ and $t_D$: Distances between one surface at the highest part of the non-bonded part (projected part) and one surface of the highest part of the bonded part (recessed part) ($t_C<t_D$)
  (viii) The ratios of $t_B/t_A$ and $t_C/t_D$ are calculated from the measurement results.
  (ix) The arithmetic average values of $t_B/t_A$ and $t_C/t_D$ obtained from each measurement sample are calculated and rounded off to the second decimal place. The obtained values are employed.

The basis weight of the spunbond non-woven fabric in the present invention is preferably in the range of 150 g/m² or more and 300 g/m² or less. The spunbond non-woven fabric having a basis weight of 150 g/m² or more allows the necessary rigidity for pleat to be obtained, which is preferable. On the other hand, the spunbond non-woven fabric having a basis weight of 300 g/m² or less, preferably 270 g/m² or less, and more preferably 260 g/m² or less allows an increase in pressure drop to be reduced and this spunbond non-woven fabric is also preferable from the viewpoint of cost.

The basis weight referred to here is determined by collecting three samples having a length of 50 cm and a width of 50 cm, measuring the mass of each of the samples, converting the average value (g) of the obtained values into a value per unit area (1 m²), and rounding off the obtained value to an integer.

The CV value of the basis weight of the spunbond non-woven fabric according to the present invention is 5% or less. A spunbond non-woven fabric having a CV value of the basis weight of preferably 4.5% or less and further preferably 4.0% or less allows the collection efficiency to be improved because the non-woven fabric can be denser associated with improvement in uniformity of the non-woven fabric and thus filter life satisfying the performance of the filter to be likely to be obtained, which is preferable. On the other hand, in order to secure a certain air permeability of the spunbond non-woven fabric and to extend filter life by reducing pressure drop, the CV value of the basis weight is more preferably 1% or more.

In the present invention, as the CV value (%) of the basis weight of the spunbond non-woven fabric, a value obtained by measuring in accordance with the following procedures is determined to be employed.
  (i) 100 small pieces of 5 cm×5 cm in total are collected from the spunbond non-woven fabric.
  (ii) The mass (g) of each small piece is measured and converted into a value per unit area (1 m²).
  (iii) The respective average value ($W_{ave}$) and standard deviation ($W_{sdv}$) of the conversion results in (ii) are calculated.
  (iv) Based on the results of (i) to (iii), the CV value (%) of the basis weight is calculated in accordance with the following formula, and the obtained CV (%) value of the basis weight is rounded off to the first decimal place.

$$CV \text{ Value of basis weight } (\%) = W_{sdv}/W_{ave} \times 100$$

The thickness of the spunbond non-woven fabric in the present invention is preferably 0.50 mm or more and 0.80 mm or less and more preferably 0.51 mm or more and 0.78 mm or less. Setting the thickness to 0.50 mm or more allows rigidity to be improved and the non-woven fabric suitable for use as a filter to be provided. Setting the thickness of 0.80 mm or less also allows the spunbond non-woven fabric to have excellent handling properties and processing properties as a filter.

In the present invention, as the thickness (mm) of the spunbond non-woven fabric, the value obtained by the measuring the thickness in accordance with the following method is determined to be employed.
  (i) The thicknesses of the non-woven fabric are measured at 10 positions in the transverse direction at equal intervals using a thickness meter (for example, "TECLOCK®" SM-114, manufactured by TECLOCK Co.)

(ii) The thickness (mm) of the non-woven fabric is determined by rounding off the above arithmetic average value to the second decimal place.

The apparent density of the spunbond non-woven fabric in the present invention is preferably 0.25 g/cm$^3$ or more and 0.40 g/cm$^3$ or less. The spunbond non-woven fabric having an apparent density of 0.25 g/cm$^3$ or more and 0.40 g/cm$^3$ or less allows the spunbond non-woven fabric to have a dense structure that prevents dust from penetrating into the inside, resulting in excellent dust brush-off performance. The more preferable apparent density range is 0.26 g/cm$^3$ or more and 0.38 g/cm$^3$ or less.

In the present invention, as the apparent density (g/cm$^3$) of the spunbond non-woven fabric, a value obtained in accordance with the following formula from the values of the above basis weight and thickness of the spunbond non-woven fabric is determined to be employed.

$$\text{Apparent density (g/cm}^3\text{)} = \text{Basis weight (g/m}^2\text{)} / \text{Thickness (mm)}/1000$$

The air permeability of the spunbond non-woven fabric in the present invention is preferably 10 (cm$^2$/(cm$^2$·sec)) or more and 130 (cm$^2$/(cm$^2$·sec)) or less. The spunbond non-woven fabric having an air permeability of 10 (cm$^2$/(cm$^2$·sec)) or more and preferably 13 (cm$^2$/(cm$^2$·sec)) or more allows an increase in the pressure drop to be reduced. The spunbond non-woven fabric having an air permeability per basis weight of 130 (cm$^3$/(cm$^2$·sec)) or less and preferably 105 (cm$^3$/(cm$^2$·sec)) or less allows the collection performance as a filter to be excellent because dust is less likely to accumulate inside.

In the present invention, as the air permeability (cm$^3$/(cm$^2$·sec)) of the spunbond non-woven fabric, a value measured in accordance with 6.8.1 "Frazier method" of JIS L1913: 2010 "General non-woven fabrics test method" 6.8 "Air permeability (JIS method)" as follows is determined to be employed.
  (i) 10 test specimens having a length of 150 mm and a width of 150 mm are collected in the transverse direction of the spunbond non-woven fabric at equal intervals.
  (ii) Each of the test specimens is attached to one end of the cylinder of a testing apparatus, thereafter a suction fan and an air hole are adjusted so that an inclined type barometer indicates a pressure of 125 Pa by means of a lower limit resistor, and the pressure indicated by the vertical type barometer at this time is measured.
  (iii) From the measured pressure and the type of the air hole used, the air volume passing through each of the test specimens (cm$^3$/(cm$^2$·sec)) is determined using the conversion table provided with the testing apparatus.
  (iv) The air permeability of the spunbond non-woven fabric (cm$^3$/(cm$^2$·sec)) is calculated by rounding off the obtained arithmetic average value of the air permeability of the 10 test specimens to an integer.

As described above, the spunbond non-woven fabric according to the present invention can be suitably used as a filter material for a pleated filter for a dust collector and a pleated filter for a dust collector because the spunbond non-woven fabric satisfies both dust collection performance and air permeability in balance and has excellent rigidity and pleated workability. Of these applications, the spunbond non-woven fabric may be particularly suitably used as a filter material for a pleated filter for a large air volume pulse-jet type dust collector and a filter for a large air volume pulse-jet type dust collector for which pleated shape retention in which the non-woven fabric alone can withstand dust collection under a large air volume at a flow rate of more than 300 L/minute and repeated backwashing is required. Such a filter material for a pleated filter for a dust collector can be obtained, for example, by forming the above spunbond non-woven fabric into a pleated shape. This filter material for the pleated filter for the dust collector can be formed into a filter for a cylindrical dust collector made by forming the entire filter material into a cylindrical shape and thereafter fixing the upper end and lower end of the cylinder or a filter for a panel-type dust collector made by fixing the end of the filter material for the pleated filter for the dust collector to the inner wall of a square or round frame material made of a metal material or a macromolecular resin material.

The pulse-jet type dust collector according to the present invention uses the above pleated filter for a dust collector, and, in particular, is a large air volume pulse-jet type dust collector that performs dust collection under a large air volume at a flow rate of more than 300 L/min and repeated backwashing. In this large air volume pulse-jet type dust collector, the above filter for a dust collector is used under an atmosphere of a flow rate per filter for the dust collector of 3.0 L/min or more and 5.0 L/min or less and an applied pressure of the processing air per filter for the dust collector of 0.5 MPa or more and 0.7 MPa or less.

The pulse-jet type dust collector according to the present invention is equipped with at least one filter for a dust collector that filtrates dust from the target facilities for collecting dust and is equipped with a pulse-jet mechanism that brushes off dust attached to the outer surface of the filter by injecting compressed air onto the inner surface of the filter for a dust collector in a pulse-like manner. The pulse-jet mechanism may be an on-line pulse-type mechanism that can operate while a motor for a blower of the dust collector is operating or may be an off-line pulse-type mechanism that can be operated while dust collection is interrupted.

EXAMPLES

Hereinafter, the present invention will be further described in detail with reference to Examples. The present invention, however, is not interpreted in a limited way by Examples.

[Measurement Methods].

Each property value in Examples below was measured in accordance with the following methods. In the measurement of each physical property, however, the methods not specifically described were measured in accordance with the method described above.

(1) Melting Point of Polyester (° C.)

As a differential scanning calorimeter, "Model DSC-2" manufactured by Perkin Elmer Japan Co was used.

(2) Intrinsic Viscosity (IV) of Polyester

The intrinsic viscosity (IV) of polyester was measured in accordance with the following method.

8 g of a sample was dissolved in 100 mL of ortho-chlorophenol and the relative viscosity $\eta_r$ was determined in accordance with the following formula using an Ostwald viscometer at a temperature of 25° C.

$$\eta_r = \eta/\eta_0 = (t \times d)/(t_0 \times d_0)$$

(where, $\eta$ represents the viscosity of the polymer solution, $\eta_0$ is the viscosity of ortho-chlorophenol, t represents the drop time (seconds) of the solution, d represents the density (g/cm$^3$) of the solution, $t_0$ represents the drop time (second) of ortho-chlorophenol, and $d_0$ represents the density (g/cm$^3$) of ortho-chlorophenol.)

Subsequently, the intrinsic viscosity (IV) was calculated from the relative viscosity $\eta_r$ in accordance with the following formula.

$$\text{Intrinsic Viscosity (IV)} = 0.0242\, \eta_r + 0.2634$$

(3) Cross-Sectional Thickness of Spunbond Non-Woven Fabric (Mm)

"VHX-D500" manufactured by Keyence Corporation was used as a scanning electron microscope and measurements were performed in accordance with the method described above.

(4) Thickness of Spunbond Non-Woven Fabric (Mm)

TECLOCK® SM-114 manufactured by TECLOCK Corporation was used as the thickness meter.

(5) Air Permeability of Spunbond Non-Woven Fabric ($Cm^3$/($Cm^2$·Sec))

Air permeability was measured using "FX3300-III" air permeability tester manufactured by TEXTEST AG, Switzerland.

(6) Bending Resistance of Spunbond Non-Woven Fabric in Machine Direction (mN)

Bending resistance of the spunbond non-woven fabric in the machine direction was measured using the Gurley Flexibility Tester "GAS-10" manufactured by DAIEI KAGAKU SEIKI MFG. CO., LTD.

(7) Pleated Workability of Spunbond Non-Woven Fabric (Score)
  (1) The spunbond non-woven fabric was cut into a piece having a width of 240 mm. Thereafter, this spunbond non-woven fabric was heated to 150° C. and pleat formation was performed so that a distance from the ridge of a top part of the pleated formed product to the ridge of a next top part was 35 mm while the heated spunbond non-woven fabric was being compressed.
  (2) A pleated filter was prepared by wrapping the pleated formed product around a polypropylene porous cylindrical core in a length of 45 mountain sections, heat-sealing the ends of the pleated formed product to each other, and then bonding injection-molded caps to both of the ends of the cylindrical core.
  (3) Twenty panelists visually checked the appearance of the prepared pleated filter and determined the pleated workability of the non-woven fabric in five-stage evaluation in accordance with the following criteria. Therefore, the total score ranged from a minimum of 0 to a maximum of 100. A non-woven fabric having a score of 80 or higher was determined to be acceptable.

Score 5: Very good
(There is no contact between mountain sections of the pleated formed product or no distortion in the pleated shape of the pleated formed product and the adjacent mountain sections are aligned in a straight line parallel to each other.)
Score 4: Good
(Between score 5 and score 3.)
Score 3
(There is no contact between mountain sections of the pleated formed product but the pleated shape is distorted.)
Score 2
(Between score 3 and score 1.)
Score 1
(There is distortion in the pleated shape and the mountain sections of the pleated formed product are in contact with each other.)

(8) Pleated Shape Retention

Figure 3:
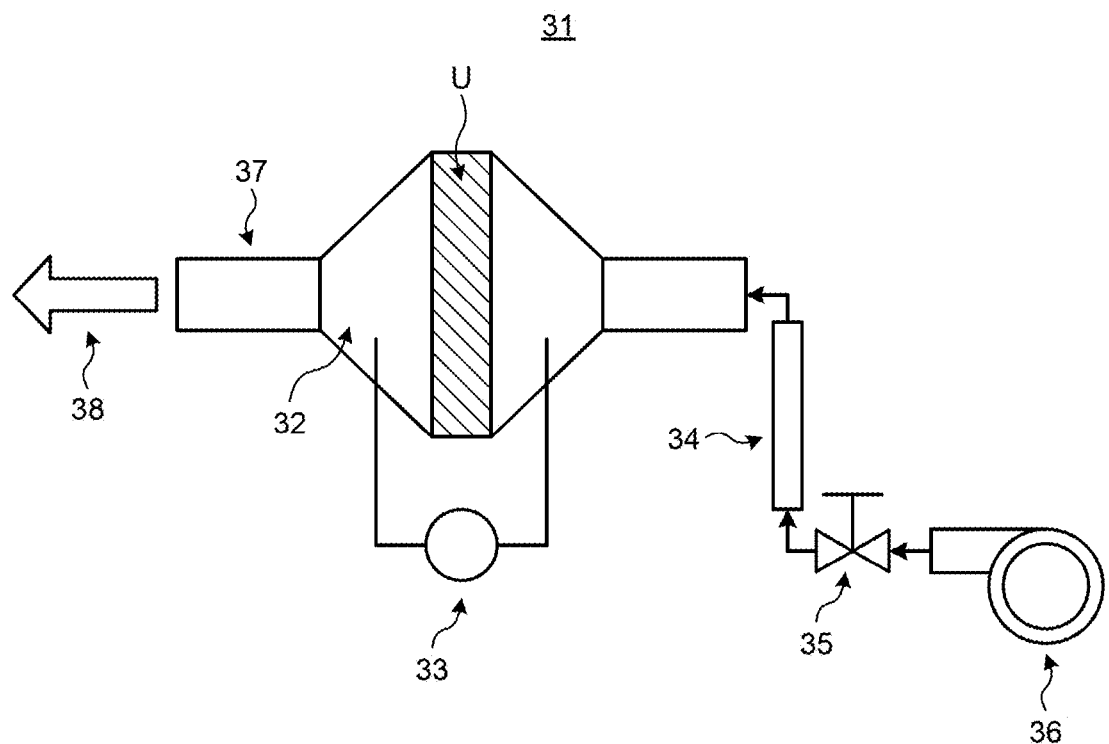
FIG. 3 is a view illustrating the configuration of a test system for conducting a pleated shape retention test according to Examples of the present invention.

FIG. 3 is a view illustrating the configuration of the test system for conducting the pleated shape retention test according to Examples of the present invention. A test system 31 illustrated in FIG. 3 is equipped with a sample holder 32 into which a test sample is set, a pressure gauge 33, a flow meter 34, a flow control valve 35, and a blower 36. The flow meter 34, the flow control valve 35, and the blower 36 are connected to the sample holder 32. In this test system 31, air is delivered by the blower 36 and air is discharged from an air outlet 37 in the direction of an arrow 38.

Figure 4:
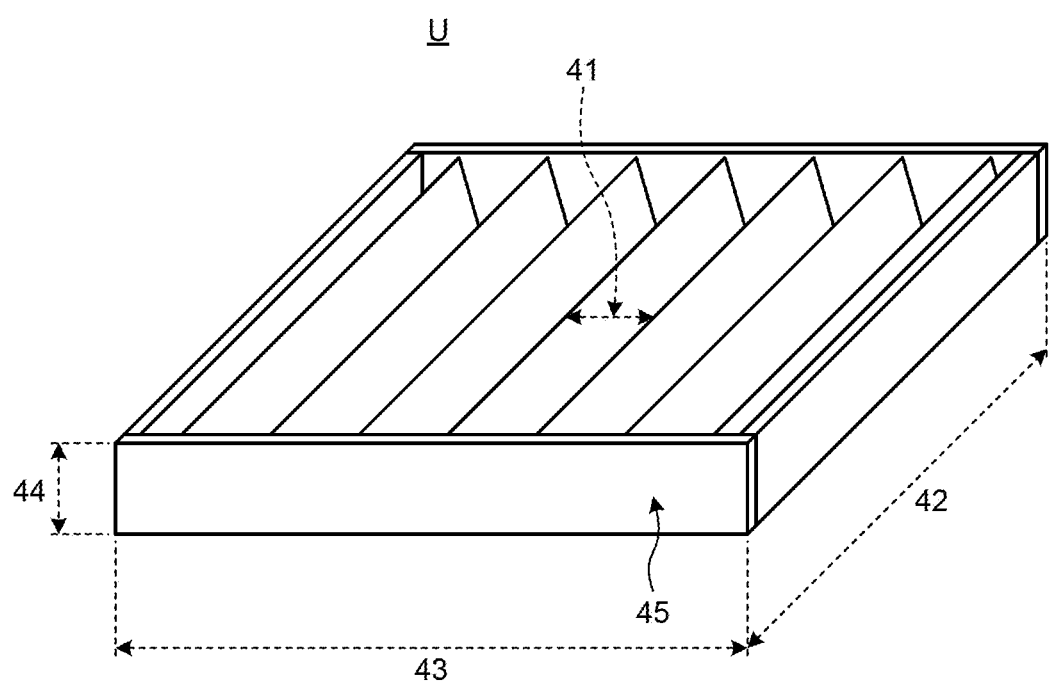
FIG. 4 is a view illustrating a measurement unit in the pleated shape retention test according to Examples of the present invention.

First, the spunbond non-woven fabric is pleated so that the height of the mountain section is 48 mm. Subsequently, as illustrated in FIG. 4, three units for evaluation U are prepared by enclosing the pleated substrate with a frame material 45 having a unit length 42 of 30 cm, a unit width 43 of 30 cm, and a unit height 44 of 48 mm so that the pitch 41 of the mountain sections is 1.3 mm and the number of mountain sections is 23. The frame material 45 is not particularly specified as long as the frame material 45 is a material that does not cause air leakage from the frame material 45 during measurement. Subsequently, the prepared unit for evaluation U is set in the sample holder 32. The air volume was controlled with the flow control valve 35 so as to be 2.0, 4.0, 5.0, 6.0, and 7.0 m³/min (5 kinds of air volumes in total) and the pressure drop at each flow rate was measured. The average value of the result of the pressure drop measurement of the three units for evaluation U is calculated, a graph having air flow rate on the horizontal axis and pressure drop on the vertical axis is prepared, and a determination coefficient ($R^2$) is calculated by a linear-square approximation to determine the pleated shape retention in accordance with the following criteria.

Pleated shape retention A: $R^2 > 0.995$
Pleated shape retention B: $0.990 \leq R^2 \leq 0.995$
Pleated shape retention C: $R^2 < 0.990$ With respect to the evaluation of the pleated shape retention, A was determined to be excellent, B to be second best compared to A, and C to be poor. In Table 1 and Table 2, the numbers in parentheses postposed to the evaluation of A, B, and C are the values of the above determination coefficient ($R^2$).

The non-woven fabric having high pleated shape retention causes the pressure drop to increase linearly with an increase in air volume because the pleat does not deform and thus the filtration area does not decrease even under a large air volume. Therefore, the determination coefficient is close to 1. On the other hand, the non-woven fabric having low pleated shape retention causes the pressure drop not to increase linearly and the determination coefficient to be low because the effective filtration area decreases due to collapse of the pleat caused by wind pressure as the air volume increases and thus the pressure drop increases.

(9) Fluffiness of Spunbond Non-Woven Fabric (Score)
  (1) Samples having a length in the machine direction of 250 mm and a length in the transverse direction of 25 mm are cut out at five positions of each of the front surface and back surface of a spunbond non-woven fabric at equal intervals in the transverse direction of the spunbond non-woven fabric, that is, ten samples in total are cut out.
  (2) The samples are abraded using a Gakushin-type dyed product abrasion fastness tester using a load of 300 gf and a number of abrasion of 200 reciprocating times.
  (3) Twenty panelists determined the fluffiness on the surface of the spunbond non-woven fabric after the test in five-stage evaluation in accordance with the following criteria by visual observation and texture when the panelists touched the spunbond non-woven fabric with their fingers. Based on the total score determined by each panelist, the fluffiness of the spunbond non-woven fabric was evaluated. Therefore, the total score ranged from a minimum of 0 to a maximum of 100. A non-woven fabric having a score of 80 or higher was determined to be acceptable.

Score 5: Very good
(No fluff is generated on the surface of the spunbond non-woven fabric, the surface of the spunbond non-woven fabric has smooth sense of touch when the spunbond non-woven fabric is touched with fingers, and any resistance is not felt on the fingers.)

Score 4: Good
(Between score 5 and score 3.)

Score 3: Normal
(No fluff is generated on the surface of the spunbond non-woven fabric, but the surface of the spunbond non-woven fabric has rough sense of touch when the spunbond non-woven fabric is touched with fingers and resistance is felt on the fingers.)

Score 2: Poor
(Between score 3 and score 1.)

Score 1: Very Poor
(Fluff is generated on the surface of the spunbond non-woven fabric, the surface of the spunbond non-woven fabric has rough sense of touch when the spunbond non-woven fabric is touched with fingers and resistance is felt on the fingers.)

(10) Basis Weight of Spunbond Non-Woven Fabric (g/m$^2$)

The basis weight of the spunbond non-woven fabric was calculated in accordance with the method described above.

(11) Apparent Density of Non-Woven Fabric

The apparent density of spunbond non-woven fabrics was calculated in accordance with the method described above.

(12) CV Value of Basis Weight of Spunbond Non-Woven Fabric (%)

The CV value of the basis weight of the spunbond non-woven fabric was calculated in accordance with the method described above.

(13) Average Single Fiber Diameter of Thermoplastic Continuous Filament (μm)

The average single fiber diameter of the thermoplastic continuous filament was calculated in accordance with the method described above using a scanning electron microscope "VHX-D500" manufactured by Keyence Corporation.

(14) Collection Efficiency of Spunbond Non-Woven Fabric (%)

Figure 5:
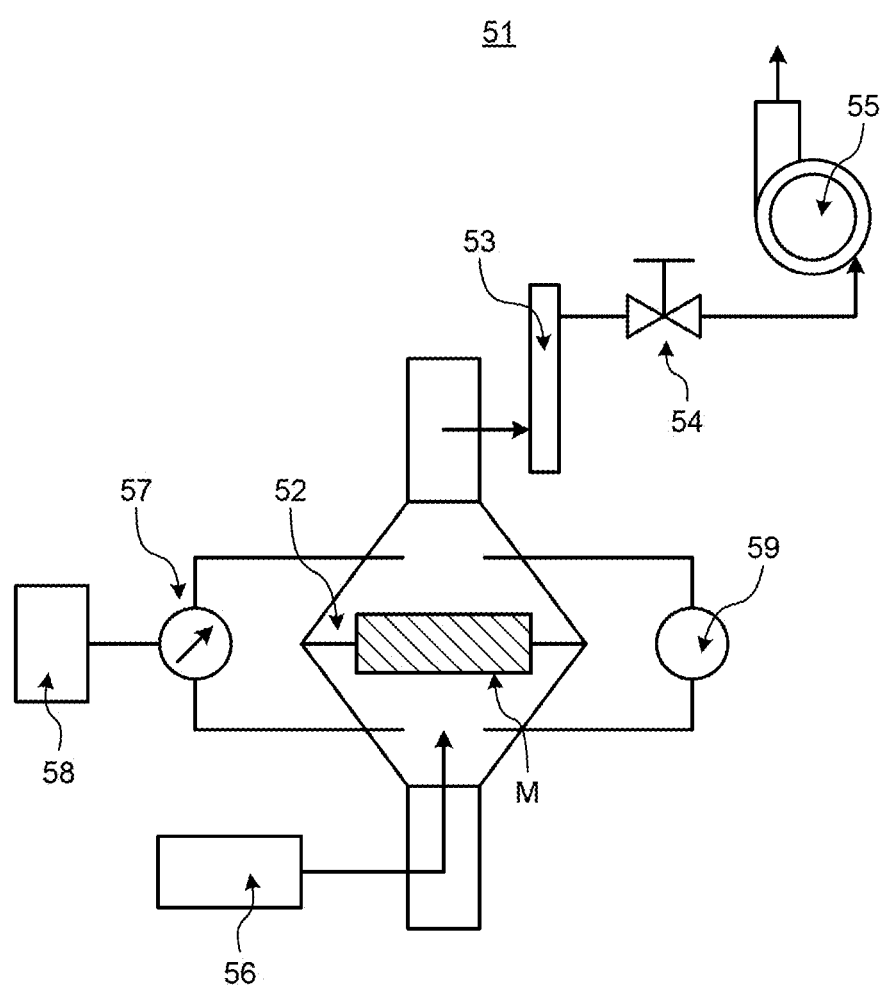
FIG. 5 is a view illustrating the configuration of a test system for conducting a collection performance test according to Examples of the present invention.

FIG. 5 is a view illustrating the configuration of the test system for performing the collection performance test according to Examples in the present invention. A test system 51 illustrated in FIG. 5 is equipped with a sample holder 52 in which a test sample M is set, a flow meter 53, a flow control valve 54, a blower 55, a dust feeder 56, a switching cock 57, and a particle counter 58. The flow meter 53, the flow control valve 54, the blower 55, and the dust feeder 56 are connected to the sample holder 52. The flow meter 53 is connected to the blower 55 through the flow control valve 54. Dust is supplied to the sample holder 52 from the dust feeder 56 by intake air of the blower 55. The particle counter 58 is connected to the sample holder 52 and the number of dust particles in the upstream side and the number of dust particles in the downstream side of the test sample M can be each measured through the switching cock 57. First, three samples having a size of 15 cm×15 cm were collected from any part of the non-woven fabric and the collected test sample M was set in the sample holder 52. The evaluation area of the test sample was set to 115 cm$^2$. At the measurement of the collection performance, 10% by weight solution of polystyrene 0.309U (manufactured by Nacalai Tesque, Inc.) was diluted up to 200 times with distilled water and the diluted solution was filled into the dust feeder 56. The air volume was adjusted with the flow control valve 54 so that a velocity passing through the filter was set to 3.0 m/min, the dust concentration was stabilized in the range of 20,000 to 70,000 particles/(2.83×10$^{-4}$ m$^3$ (0.01 ft$^3$)), and the number of dust particles in the upstream side and the number of dust particles in the downstream side of the test sample M were each measured using the particle counter 58 (KC-01D, manufactured by Rion Corporation) with respect to the range of a dust particle diameter of 0.3 to 0.5 μm. The obtained value was substituted into the following formula and the determined value was rounded off to an integer to determine the collection performance (%).

$$\text{Collection performance (\%)} = [1-(D1/D2)] \times 100$$

Where, D1 is the number of dust particles in downstream (sum of three times) and D2 is the number of dust particles in upstream (sum of three times).

(15) Pressure Drop (Pa)

The static pressure difference between the upstream and the downstream of the test sample M during the above collection performance measurement was read from a pressure gauge 59 and pressure drop was calculated by rounding off the average value of the values obtained from the three samples to an integer.

[Used Resins]

Subsequently, the resins used in Examples and Comparative Examples will be described in detail.

Polyester-based resin A: Polyethylene terephthalate (PET) dried to a moisture content of 50 ppm by mass or less and having an intrinsic viscosity (IV) of 0.65 and a melting point of 260° C.

Polyester-based resin B: Copolymer polyethylene terephthalate (CO-PET) dried to a moisture content of 50 ppm by mass or less and having an intrinsic viscosity (IV) of 0.64, an isophthalic acid copolymerization ratio of 11% by mole, and a melting point of 230° C.

Example 1

Polyester-based resin A described above and Polyester-based resin B described above were melted at temperatures of 295° C. and 280° C., respectively. Thereafter, Polyester-based resin A serving as the core component and Polyester-based resin B serving as the sheath component were spun from fine holes at a mass ratio of sheath:core of 80:20 at a spinneret temperature of 295° C. and thereafter filaments having a circular cross-sectional shape were spun at a pinning speed of 4,900 m/minute by an air sucker. The spun filament was deposited on a moving net conveyor by regulating the fiber arrangement with an opening plate to collect a fiber web made of the fiber having an average single fiber diameter of 14.8 μm. The collected fiber web was temporarily bonded with calender rolls made of a pair of flat rolls at a temperature of 140° C. and a linear pressure of 50 kg/cm. Subsequently, the fiber web was bonded using embossing rolls made of a pair of engraved rolls having a bonding area ratio of 10% and an area per bonded part of 1.6 mm$^2$ under conditions of a temperature of 200° C. at both the upper roll and the lower roll and a linear pressure of 70 kg/cm to give a spunbond non-woven fabric having a basis weight of 260 g/m². The sheet cross-sectional thicknesses of $1-t_B/t_A$ and $t_C/t_D$ of the obtained spunbond non-woven fabric were 0.67 and 0.68, respectively. The CV value of the basis weight was 3.3%, the sheet thickness was 0.74 mm, and the bending resistance in the machine direction was 53 mN. The results are listed in Table 1.

C., respectively. The sheet cross-sectional thicknesses of $1-t_B/t_A$ and $t_C/t_D$ of the obtained spunbond non-woven fabric were 0.70 and 0.82, respectively. The CV value of the basis weight was 3.3%, the sheet thickness was 0.93 mm, and the bending resistance in the machine direction was 61 mN. The results are listed in Table 1.

TABLE 1

| | | | Unit | Example 1 | Example 2 | Example 3 | Example 4 | Example 5 | Example 6 | Example 7 |
|---|---|---|---|---|---|---|---|---|---|---|
| Raw materials | First component | Kind of resin | — | Polyester-based Resin A | Polyester-based Resin A | Polyester-based Resin A | Polyester-based Resin A | Polyester-based Resin A | Polyester-based Resin A | Polyester-based Resin A |
| | Second component | Kind of resin | — | Polyester-based Resin B | Polyester-based Resin B | Polyester-based Resin B | Polyester-based Resin B | Polyester-based Resin B | Polyester-based Resin B | Polyester-based Resin B |
| Fiber | Core/sheath ratio | Core part/sheath part | %/% | 80/20 | 80/20 | 80/20 | 80/20 | 80/20 | 80/20 | 80/20 |
| | Average single fiber diameter | | μm | 14.8 | 14.8 | 14.8 | 14.8 | 14.8 | 24.6 | 12.5 |
| Bonding | Embossing roll temperature | Upper roll/Lower roll | °C. | 200/200 | 180/180 | 180/210 | 200/200 | 200/200 | 200/200 | 200/200 |
| | Embossing roll line pressure | | kg/cm | 70 | 70 | 70 | 70 | 70 | 70 | 70 |
| | Ratio of bonding area | | % | 10 | 10 | 10 | 6 | 18 | 10 | 10 |
| | Area per bonded part | | mm² | 1.6 | 1.6 | 1.6 | 1.6 | 1.6 | 1.6 | 1.6 |
| Non-woven fabric | Cross-section thickness $(1 - t_B/t_A)$ | | — | 0.67 | 0.53 | 0.70 | 0.79 | 0.68 | 0.52 | 0.67 |
| | Cross-section thickness $(t_C/t_D)$ | | — | 0.68 | 0.66 | 0.82 | 0.66 | 0.73 | 0.69 | 0.69 |
| | Basis weight | | g/m² | 260 | 260 | 260 | 260 | 260 | 260 | 260 |
| | CV Value of basis weight | | % | 3.3 | 3.4 | 3.3 | 3.5 | 3.2 | 4.3 | 2.7 |
| | Sheet thickness | | mm | 0.74 | 1.02 | 0.93 | 1.21 | 0.73 | 0.96 | 0.61 |
| | Apparent density | | g/cm³ | 0.35 | 0.25 | 0.28 | 0.21 | 0.36 | 0.27 | 0.43 |
| | Bending resistance (Machine direction) | | mN | 53 | 57 | 61 | 73 | 41 | 53 | 42 |
| | Air permeability | | cm³/(cm²·sec) | 13 | 15 | 11 | 17 | 13 | 18 | 11 |
| | Collection efficiency | | % | 62 | 65 | 63 | 65 | 57 | 51 | 72 |
| | Pressure drop | | Pa | 41 | 38 | 48 | 36 | 43 | 33 | 50 |
| | Pleated workability | | Score (0 to 100) | 95 | 92 | 90 | 87 | 88 | 93 | 89 |
| | Pleated shape retention | | Good A > B > C Poor | A (0.998) | A (0.999) | A (0.999) | A (0.999) | B (0.993) | A (0.998) | B (0.992) |
| | Fluffiness | | Score (0 to 100) | 93 | 87 | 96 | 84 | 98 | 91 | 89 |

Example 2

A spunbond non-woven fabric having a basis weight of 260 g/m² was obtained under the same conditions as the conditions in Example 1 except that in bonding, the temperature at both upper and lower embossing rolls was changed from 200° C. to 180° C. The sheet cross-sectional thicknesses of $1-t_B/t_A$ and $t_C/t_D$ of the obtained spunbond non-woven fabric were 0.53 and 0.66, respectively. The CV value of the basis weight was 3.4%, the sheet thickness was 1.02 mm, and the bending resistance in the machine direction was 57 mN. The results are listed in Table 1.

Example 3

A spunbond non-woven fabric having a basis weight of 260 g/m² was obtained under the same conditions as the conditions in Example 1 except that in bonding, the upper embossing roll temperature and the lower embossing roll temperature were changed from 200° C. to 180° C. and 210°

Example 4

A spunbond non-woven fabric having a basis weight of 260 g/m² was obtained under the same conditions as the conditions in Example 1 except that in bonding, the upper and lower embossing rolls were changed from the embossing rolls made of a pair of engraved rolls having a bonding area ratio of 10% and an area per bonded part of 1.6 mm² to embossing rolls made of a pair of engraved rolls having a bonding area ratio of 6% and an area per bonded part of 1.6 mm². The sheet cross-sectional thicknesses of $1-t_B/t_A$ and $t_C/t_D$ of the obtained spunbond non-woven fabric were 0.79 and 0.66, respectively. The CV value of the basis weight was 3.5%, the sheet thickness was 1.21 mm, and the bending resistance in the machine direction was 73 mN. The results are listed in Table 1.

Example 5

A spunbond non-woven fabric having a basis weight of 260 g/m² was obtained by bonding under the same conditions as the conditions in Example 1 except that the upper and lower embossing rolls were changed from the embossing rolls made of a pair of engraved rolls having a bonding area ratio of 10% and an area per bonded part of 1.6 mm² to embossing rolls made of a pair of engraved rolls having a bonding area ratio of 18% and an area per bonded part of 1.6 mm². The sheet cross-sectional thicknesses of $1-t_B/t_A$ and $t_C/t_D$ of the obtained spunbond non-woven fabric were 0.68 and 0.73, respectively. The CV value of the basis weight was 3.2%, the sheet thickness was 0.73 mm, and the bending resistance in the machine direction was 41 mN. The results are listed in Table 1.

Example 6

A spunbond non-woven fabric having a basis weight of 260 g/m² was obtained under the same conditions as the conditions in Example 1 except that the discharge volume and the spinning speed were changed so that the average single fiber diameter was 24.6 µm, and the speed of the net conveyor was changed so that the basis weight was the same as in Example 1. The sheet cross-sectional thicknesses of $1-t_B/t_A$ and $t_C/t_D$ of the obtained spunbond non-woven fabric were 0.52 and 0.69, respectively. The CV value of the basis weight was 4.3%, the sheet thickness was 0.96 mm, and the bending resistance in the machine direction was 53 mN. The results are listed in Table 1.

Example 7

A spunbond non-woven fabric having a basis weight of 260 g/m² was obtained under the same conditions as the conditions in Example 1 except that the discharge volume and the spinning speed were changed so that the average single fiber diameter was 12.5 µm, and the speed of the net conveyor was changed so that the basis weight was the same as in Example 1. The sheet cross-sectional thicknesses of $1-t_B/t_A$ and $t_C/t_D$ of the obtained spunbond non-woven fabric were 0.67 and 0.69, respectively. The CV value of the basis weight was 2.7%, the sheet thickness was 0.61 mm, and the bending resistance in the machine direction was 42 mN. The results are listed in Table 1.

The properties of the obtained spunbond non-woven fabrics are as listed in Table 1. All of the spunbond non-woven fabrics in Examples 1 to 7 had a bending resistance in the machine direction of 41 mN or more, a CV value of the basis weight of 3.5% or less, a pressure drop of 50 Pa or less, and a collection efficiency of 50% or more and had excellent rigidity and uniformity of the basis weight and thus exhibited excellent properties as a filter substrate. As the results of the pleated workability, the pleated shape retention, and the fluffiness, the pleated workability had a score of 87 or higher, the pleated shape retention had score B or better, and the fluffiness had a score of 87 or higher, all of which were also excellent.

Comparative Example 1

A spunbond non-woven fabric having a basis weight of 260 g/m² was obtained under the same conditions as the conditions in Example 1 except that, in the production step in Example 1, the steps were changed so that a step of winding the sheet obtained in the step of temporarily bonding, thereafter cooling the wound sheet to room temperature, and feeding this sheet to the embossing rolls was provided between the step of temporarily bonding the collected fiber web and the step of bonding the fiber web using the embossing rolls, that is, changed so that the step of bonding the fiber web using the embossing rolls was not continuously performed after the step of temporarily bonding the fiber web. The sheet cross-sectional thicknesses of $1-t_B/t_A$ and $t_C/t_D$ of the obtained spunbond non-woven fabric were 0.40 and 0.69, respectively. The CV value of the basis weight was 3.4%, the sheet thickness was 0.72 mm and the bending resistance in the machine direction was 37 mN. The results are listed in Table 2.

TABLE 2

| | | | Unit | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Raw materials | First component | Kind of resin | — | Polyester-based Resin A | Polyester-based Resin A | Polyester-based Resin A | Polyester-based Resin A | Polyester-based Resin A | Polyester-based Resin A | Polyester-based Resin A |
| | Second component | Kind of resin | — | Polyester-based Resin B | Polyester-based Resin B | Polyester-based Resin B | Polyester-based Resin B | Polyester-based Resin B | Polyester-based Resin B | Polyester-based Resin B |
| Fiber | Core/sheath ratio | Core part/sheath part | %/% | 80/20 | 80/20 | 80/20 | 80/20 | 80/20 | 80/20 | 80/20 |
| | Average single fiber diameter | | µm | 14.8 | 14.8 | 14.8 | 14.8 | 29.2 | 11.2 | 14.8 |
| Bonding | Embossing roll temperature | Upper roll/Lower roll | °C. | 200/200 | 200/200 | 200/200 | 200/200 | 200/200 | 200/200 | 205/205 |
| | Embossing roll line pressure | | kg/cm | 70 | 70 | 70 | 70 | 70 | 70 | 70 |
| | Ratio of bonding area | | % | 10 | 15 | 3 | 24 | 10 | 10 | 18 |
| | Area per bonded part | | mm² | 1.6 | 0.5 | 1.6 | 1.6 | 1.6 | 1.6 | 0.7 |
| Non-woven fabric | Cross-section thickness $(1 - t_B/t_A)$ | | — | 0.40 | 0.61 | 0.79 | 0.65 | 0.45 | 0.70 | 0.61 |
| | Cross-section thickness $(t_C/t_D)$ | | — | 0.69 | 0.45 | 0.62 | 0.55 | 0.68 | 0.69 | 0.57 |
| | Basis weight | | g/m² | 260 | 260 | 260 | 260 | 260 | 260 | 260 |
| | CV Value of basis weight | | % | 3.4 | 3.2 | 3.5 | 3.2 | 5.2 | 2.6 | 10.5 |
| | Sheet thickness | | mm | 0.72 | 0.61 | 1.13 | 0.62 | 1.01 | 0.53 | 0.51 |
| | Apparent density | | g/cm³ | 0.36 | 0.43 | 0.23 | 0.42 | 0.26 | 0.49 | 0.51 |
| | Bending resistance (Machine direction) | | mN | 37 | 25 | 85 | 21 | 81 | 36 | 25 |
| | Air permeability | | cm³/(cm²·sec) | 14 | 10 | 18 | 7 | 19 | 9 | 10 |
| | Collection efficiency | | % | 61 | 55 | 68 | 48 | 43 | 78 | 30 |
| | Pressure drop | | Pa | 39 | 50 | 33 | 57 | 30 | 52 | 50 |

TABLE 2-continued

|  | Unit | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Pleated workability | Score (0 to 100) | 83 | 73 | 72 | 73 | 71 | 74 | 78 |
| Pleated shape retention | Good A > B > C Poor | C (0.987) | C (0.986) | A (0.999) | C (0.988) | A (0.999) | C (0.988) | C (0.985) |
| Fluffiness | Score (0 to 100) | 72 | 92 | 67 | 92 | 88 | 72 | 91 |

Comparative Example 2

A spunbond non-woven fabric having a basis weight of 260 g/m² was obtained under the same conditions as the conditions in Example 1 except that in bonding, the upper and lower embossing rolls were changed from the embossing rolls made of a pair of engraved rolls having a bonding area ratio of 10% and an area per bonded part of 1.6 mm² to embossing rolls made of an engraved roll having a bonding area ratio of 15% and an area per bonded part of 0.5 mm² and a flat roll. The sheet cross-sectional thicknesses of $1-t_B/t_A$ and $t_C/t_D$ of the obtained spunbond non-woven fabric were 0.61 and 0.45, respectively. The CV value of the basis weight was 3.2%, the sheet thickness was 0.61 mm, and the bending resistance in the machine direction was 25 mN. The results are listed in Table 2.

Comparative Example 3

A spunbond non-woven fabric having a basis weight of 260 g/m² was obtained by bonding under the same conditions as the conditions in Example 1 except that in bonding, the upper and lower embossing rolls were changed from the embossing rolls made of a pair of engraved rolls having a bonding area ratio of 10% and an area per bonded part of 1.6 mm² to embossing rolls made of a pair of engraved rolls having a bonding area ratio of 3% and an area per bonded part of 1.6 mm². The sheet cross-sectional thicknesses of $1-t_B/t_A$ and $t_C/t_D$ of the obtained spunbond non-woven fabric were 0.79 and 0.62, respectively. The CV value of the basis weight was 3.5%, the sheet thickness was 1.13 mm, and the bending resistance in the machine direction was 85 mN. The results are listed in Table 2.

Comparative Example 4

A spunbond non-woven fabric having a basis weight of 260 g/m² was obtained by bonding under the same conditions as the conditions in Example 1 except that in bonding, the upper and lower embossing rolls were changed from the embossing rolls made of a pair of engraved rolls having a bonding area ratio of 10% and an area per bonded part of 1.6 mm² to embossing rolls made of a pair of engraved rolls having a bonding area ratio of 24% and an area per bonded part of 1.6 mm². The sheet cross-sectional thicknesses of $1-t_B/t_A$ and $t_C/t_D$ of the obtained spunbond non-woven fabric were 0.65 and 0.55, respectively. The CV value of the basis weight was 3.2%, the sheet thickness was 0.62 mm, and the bending resistance in the machine direction was 21 mN. The results are listed in Table 2.

Comparative Example 5

A spunbond non-woven fabric having a basis weight of 260 g/m² was obtained under the same conditions as the conditions in Example 1 except that the discharge volume and the spinning speed were changed so that the average single fiber diameter was 29.2 μm, and the speed of the net conveyor was changed so that the fiber thickness was the same as in Example 1. The sheet cross-sectional thicknesses of $1-t_B/t_A$ and $t_C/t_D$ of the obtained spunbond non-woven fabric were 0.45 and 0.68, respectively. The CV value of the basis weight was 5.2%, the sheet thickness was 1.01 mm, and the bending resistance in the machine direction was 81 mN. The results are listed in Table 2.

Comparative Example 6

A spunbond non-woven fabric having a basis weight of 260 g/m² was obtained under the same conditions as the conditions in Example 1 except that the discharge volume and the spinning speed were changed so that the average single fiber diameter was 11.2 μm, and the speed of the net conveyor was changed so that the fiber thickness was the same as in Example 1. The sheet cross-sectional thicknesses of $1-t_B/t_A$ and $t_C/t_D$ of the obtained spunbond non-woven fabric were 0.70 and 0.69, respectively. The CV value of the basis weight was 2.6%, the sheet thickness was 0.53 mm, and the bending resistance in the machine direction was 36 mN. The results are listed in Table 2.

Comparative Example 7

Polyester-based resin A described above and Polyester-based resin B described above were melted at temperatures of 295° C. and 280° C., respectively. Thereafter, Polyester-based resin A serving as the core component and Polyester-based resin B serving as the sheath component were spun from fine holes at a mass ratio of sheath:core of 80:20 at a spinneret temperature of 300° C. and thereafter filaments having a circular cross-sectional shape was spun at a spinning speed of 4,400 m/minute by an air sucker. The spun filament was made to collide to a metal collision plate placed at the exit of the air sucker and was opened by charging the fiber with friction charge to collect a fiber web made of the fiber having an average single fiber diameter of 14.8 μm. Subsequently, the fiber web was bonded by embossing rolls made of a pair of engraved rolls having a bonding area ratio of 18% and an area per bonded part of 0.7 mm² under conditions of a temperature of 205° C. at both the upper roll and the lower roll and a linear pressure of 70 kg/cm to give a spunbond non-woven fabric having a basis weight of 260 g/m². The sheet cross-sectional thicknesses of $1't_B/t_A$ and $t_C/t_D$ of the obtained spunbond non-woven fabric were 0.61 and 0.57, respectively. The CV value of the basis weight was 10.5%, the sheet thickness was 0.51 mm, and the bending resistance in the machine direction was 25 mN. The results are listed in Table 2.

The properties of the obtained non-woven fabrics are as listed in Tables 1 and 2. The non-woven fabric in Comparative Example 1 had a thinner sheet cross-sectional thickness $(1-t_B/t_A)$ and inferior fluffiness. The non-woven fabrics in Comparative Examples 2, 3, 4, and 7 had a thinner sheet cross-sectional thickness $(t_C/t_D)$ and inferior pleated workability. The non-woven fabric in Comparative Example 2, for which bonding was performed using an engraved roll for one surface of the fiber web, had lower bending resistance and thus had inferior pleated workability and pleated shape retention. The non-woven fabric in Comparative Example 3, for which bonding was performed using the embossing rolls having a bonding area ratio of 3%, had a thicker thickness and thus had excessively high bending resistance in the machine direction and inferior pleated workability. The non-woven fabric in Comparative Example 4, for which bonding was performed using the embossing rolls having a bonding area ratio of 24%, had a thinner thickness and thus had lower bending resistance in the machine direction and inferior pleated workability and pleated shape retention. The non-woven fabric in Comparative Example 5, in which the fiber having a thick average single fiber diameter formed under the same conditions as the conditions in Example 1 was used, had a thicker thickness and thus had higher bending resistance in the machine direction and inferior pleated workability. The non-woven fabric in Comparative Example 6, in which the fiber having a thin average single fiber diameter formed under the same conditions as the conditions in Example 1 was used, had a thinner thickness and thus had lower bending resistance and inferior pleated workability and pleated shape retention.

INDUSTRIAL APPLICABILITY

The spunbond non-woven fabrics, filter materials for pleated filters of dust collectors, pleated filters for dust collectors, and large airflow pulse-jet type dust collectors according to the present invention are preferably used because the spunbond non-woven fabrics have high rigidity that is excellent in pleated shape retention under a large air volume and pleated workability while balance between dust collection performance and air permeability is satisfied. The scope of applications, however, is not limited thereto.

REFERENCE SIGNS LIST

11 Projected part
12 Recessed part
21 Filter material for pleated filter for dust collector
22 Mountain section
23 Valley section
24 Arrow indicating machine direction (dashed arrow)
25 Arrow indicating transverse direction (dashed arrow)
31, 51 Testing system
32 Sample holder
33 Pressure gauge
34 Flow meter
35 Flow control valve
36 Blower
37 Air outlet
38 Arrows indicating air blowing direction
U Unit for evaluation
41 Pitch of mountain sections
42 Unit length
43 Unit width
44 Unit Height
45 Frame material
M Test sample
52 Sample holder
53 Flow meter
54 Flow control valve
55 Blower
56 Dust feeder
57 Switching cock
58 Particle counter
59 Pressure gauge

The invention claimed is:

1. A spunbond non-woven fabric comprising a thermoplastic continuous filament including a high melting point component and a low melting point component, the spunbond non-woven fabric being made by partially being bonded, wherein
bending resistance in a machine direction of the spunbond non-woven fabric is 40 mN or more and 80 mN or less,
the spunbond non-woven fabric includes a nonbonded projected part and a bonded recessed part, and
in a non-woven fabric cross-section, a thickness from one surface to another surface of the projected part is determined to be $t_A$, a thickness from one surface to another surface of the recessed part is determined to be $t_B$, and respective distances from one surface of the projected part to one surface of the recessed part are determined to be $t_C$ and $t_D$ ($t_C < t_D$), and the spunbond non-woven fabric has a relation represented by formulas (1) and (2) below:

$$0.5 \leq 1 - t_B/t_A < 1.0 \quad (1)$$

$$0.65 < t_C/t_D < 1.0. \quad (2)$$

2. The spunbond non-woven fabric according to claim 1, wherein a CV value of a basis weight is 5% or less.

3. The spunbond non-woven fabric according to claim 1, wherein a ratio of the recessed part to a total area of the spunbond non-woven fabric is 5% or more and 20% or less.

4. The spunbond non-woven fabric according to claim 1, wherein an average single fiber diameter of the thermoplastic continuous filament is 12 μm or more and 26 μm or less.

5. A dust collector comprising a pleated filter, the pleated filter comprising a filter material, where the filter material comprises the spunbond non-woven fabric according to claim 1.

6. A pleated filter comprising a filter material, where the filter material comprises the spunbond non-woven fabric according to claim 1.

7. A large air volume pulse-jet dust collector comprising the pleated filter according to claim 6.

* * * * *